US011010490B1

(12) United States Patent
Pham et al.

(10) Patent No.: US 11,010,490 B1
(45) Date of Patent: May 18, 2021

(54) SYSTEM, METHOD, AND COMPUTER-ACCESSIBLE MEDIUM TO VERIFY DATA COMPLIANCE BY ITERATIVE LEARNING

(71) Applicant: Capital One Services, LLC, McLean, VA (US)

(72) Inventors: Vincent Pham, Champaign, IL (US); Austin Walters, Savoy, IL (US); Fardin Abdi Taghi Abad, Champaign, IL (US); Kenneth Taylor, Champaign, IL (US); Reza Farivar, Champaign, IL (US); Anh Truong, Champaign, IL (US); Jeremy Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/672,259

(22) Filed: Nov. 1, 2019

(51) Int. Cl.
*G06F 17/00* (2019.01)
*G06F 21/62* (2013.01)
*G06F 16/11* (2019.01)
*G06N 5/02* (2006.01)
*G06K 9/62* (2006.01)

(52) U.S. Cl.
CPC ........ *G06F 21/6245* (2013.01); *G06F 16/122* (2019.01); *G06K 9/626* (2013.01); *G06N 5/025* (2013.01)

(58) Field of Classification Search
CPC ... G06F 21/6245; G06F 16/122; G06K 9/626; G06N 5/025
USPC ........................................ 707/600–899, 1–36
See application file for complete search history.

(56) References Cited

U.S. PATENT DOCUMENTS

2006/0184460 A1    8/2006   Cleary
2015/0254555 A1    9/2015   Williams, Jr. et al.

OTHER PUBLICATIONS

Veale, M. et al., "Some HCI GDPR-Compliant Machine Learning," University College London, University of Oxford.
Kingston, J., "Using Artificial Intelligence to Support Compliance with the General Data Protection Regulation," University of Brighton.

*Primary Examiner* — Isaac M Woo
(74) *Attorney, Agent, or Firm* — Hunton Andrews Kurth LLP

(57) ABSTRACT

An exemplary system, method, and computer-accessible medium can include, for example, establishing a unique rule-identifier in one-to-one correspondence with at least one set of unknown time-variable rules against which data is to be made compliant, obtaining at least one set of data marked compliant against the one or more set of rules, obtaining meta-data from the compliant data, obtaining at least one set of data marked non-compliant against the set of unknown time-variable rules, extracting meta-data from the non-compliant data, joining the set of compliant and non-compliant metadata to generate a set of estimated rules corresponding to the rule-identifier based at least one of (i) the meta-data of the joined set and (ii) machine learning algorithms.

20 Claims, 9 Drawing Sheets

400

100

200

400

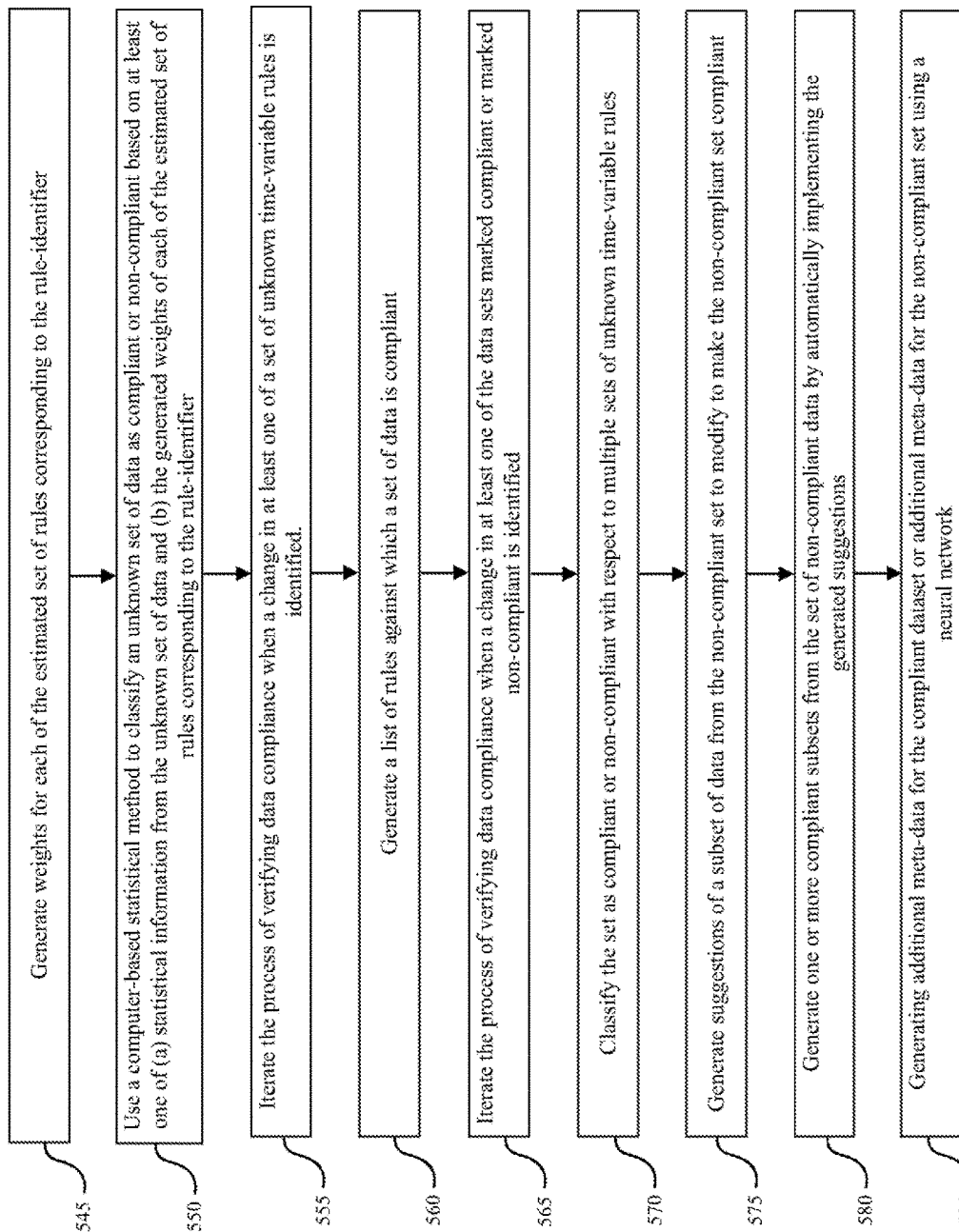

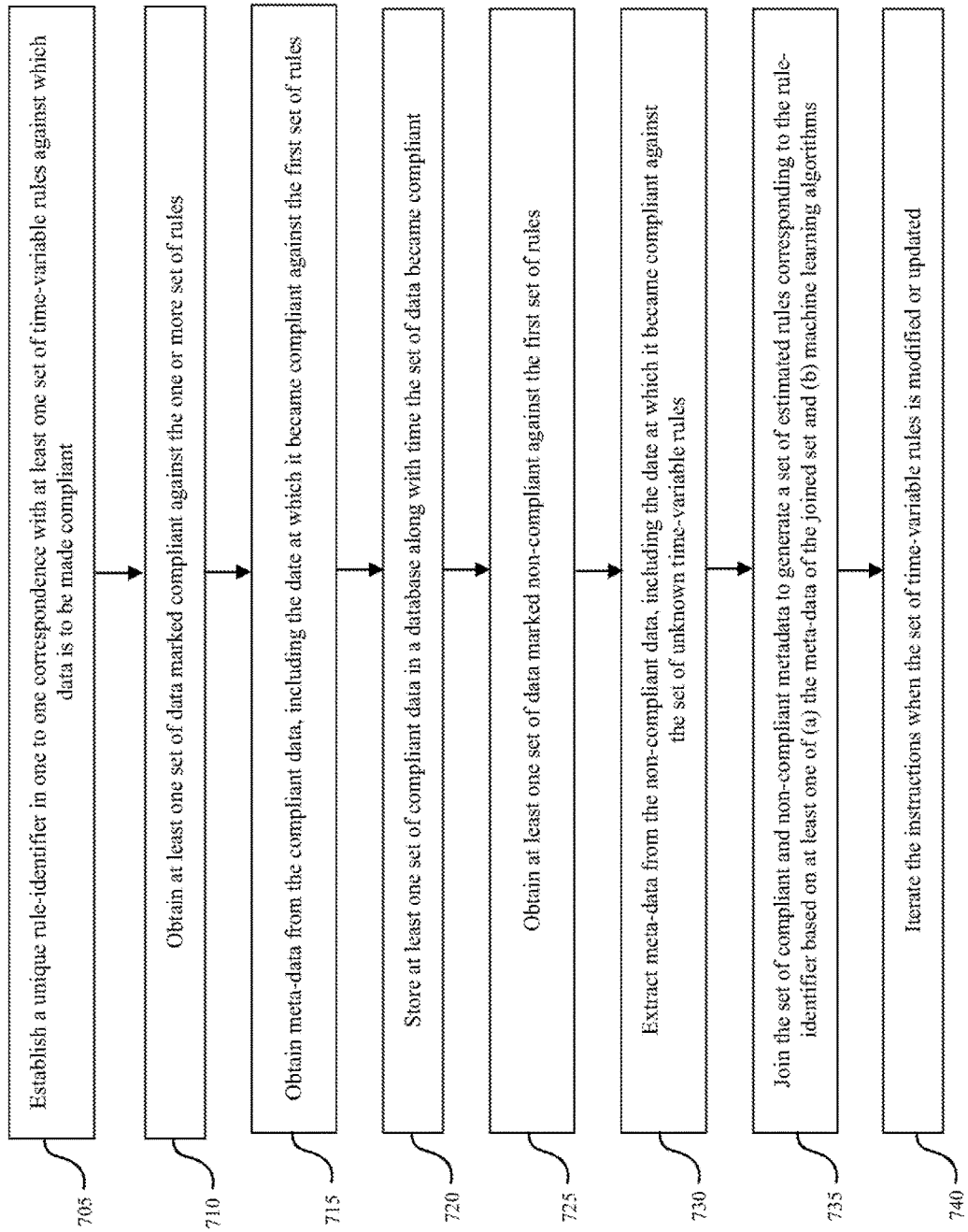

SYSTEM, METHOD, AND COMPUTER-ACCESSIBLE MEDIUM TO VERIFY DATA COMPLIANCE BY ITERATIVE LEARNING

FIELD OF THE DISCLOSURE

The present disclosure relates generally to verifying data compliance, and more to an exemplary system, method, and computer-accessible medium to verify data compliance by iterative learning.

BACKGROUND INFORMATION

Creating a classification system that uses programmed rules to classify a set of unknown data is a difficult task. Such programmed classification systems can be expensive, inaccurate, and may not be robust enough to handle data sets that contain information that is unexpected, too large, too complex, or not stored in a format that is anticipated by the programmed rules. Further, such a rules-based system cannot be easily modified when the rules defining the categories of classification are changed. Accordingly, such a rules-based system is static, and cannot continuously verify that the data is classified properly or in compliance with a particular set of parameters. Another limitation of such a rules-based system is that such rules-based algorithms and systems may be ineffective at classifying live or continuous streams of data. Yet another limitation of such a system may be that defining the rules by which a set of unknown data is to be deemed compliant or non-compliant may not be well-defined or at times, impossible to define.

Certain sets of parameters to classify data may have been designed with relationships between the sets. Additionally, such rules-based classification systems are ineffective at using the relationships between sets of parameters on which the classification system is based.

These and other deficiencies exist. Thus, it can be beneficial to provide an exemplary system, method, and computer-accessible medium for continuous verification of data compliance by iterative learning as described herein.

SUMMARY

Embodiments of the present disclosure provide a system, method, and computer-accessible medium, which can include, for example, storing in a database a first set of rules; establishing, using a processor, a unique rule-identifier in one-to-one correspondence with at least one set of unknown time-variable rules against which data is to be made compliant; obtaining at least one set of compliant data, wherein the at least one set of compliant data is compliant against the first set of rules; extracting, using a processor, meta-data from the at least one set of compliant data, including a first date at which the at least one set of compliant data became compliant against the first set of rules; obtaining at least one set of non-compliant data, wherein the at least one set of non-compliant data is marked non-compliant against the at least one set of unknown time-variable rules; extracting, using a processor, meta-data from the at least one set of non-compliant data; joining the meta-data extracted from the at least one set of compliant data and the meta-data extracted from the at least one set of non-compliant metadata to create a joined meta-data dataset; extracting, using a processor, meta-data from the joined meta-data dataset; and generating, using a processor, a set of estimated rules corresponding to the unique rule-identifier, wherein the processor uses the first date and at least one selected from the group of (i) the meta-data extracted from the joined dataset and (ii) machine learning algorithms.

Embodiments of the present disclosure provide a system, method, and computer-accessible medium, which can include, for example, a computer hardware arrangement consisting of at least a processor and memory, configured to iteratively: store in a database a first set of rules; establish a unique rule-identifier in one-to-one correspondence with a set of unknown-time variable rules against which data is to be made compliant; obtain a compliant dataset from a database, wherein the compliant dataset is complaint against the first set of rules; obtain meta-data from the compliant dataset, including a first date at which the compliant dataset became compliant against the first set of rules; obtain at least one set of non-compliant dataset, wherein the non-compliant dataset is marked non-compliant against the first set of rules; store the compliant dataset in the database along with a first time indicating the time at which the compliant dataset became compliant against the first set of rules; extract meta-data from the non-compliant dataset, including the a first date at which the non-compliant dataset became compliant against the first set of rules; join the compliant dataset and the at least one set of non-compliant metadata to create a joined dataset; generate, using the processor, a set of estimated rules corresponding to the unique rule-identifier wherein the processor uses the dates associated with the joined dataset and least one selected from the group of (i) the meta-data of the joined dataset and (ii) machine learning algorithms; obtain an unknown compliance dataset, wherein the compliance of the unknown compliance dataset with respect to the at least one set of unknown time-variable rules is unknown; and mark unknown compliance dataset as compliant or non-compliant with respect to the at least one set of unknown time-variable rules.

Embodiments of the present disclosure provide a system, method, and computer-accessible medium, which can include, for example, storing in a database a first set of rules; generating using a processor a unique rule-identifier to identify at least one set of time-variable rules against which data is to be made compliant; obtaining at least one set of compliant data, wherein the at least one set of compliant data is compliant against the first set of rules; obtaining meta-data from the at least one set of compliant data, including a first digital time at which the at least one set of compliant data became compliant against the first set of rules; storing the at least one set of compliant data in a database along with the first digital time; obtaining at least one set of non-compliant data set, wherein the at least one non-compliant dataset is marked non-compliant against the first set of rules; extracting meta-data from the at least one set of non-compliant data, including a second digital time at which the at least one set of non-compliant data became compliant against the set of unknown time-variable rules; joining the meta-data extracted from the at least one set of compliant data and the meta-data extracted from the at least one set of non-compliant data to generate a joined meta-data dataset and a set of estimated rules corresponding to the rule-identifier based at least one selected from the group of (i) the meta-data of the joined meta-data dataset and (ii) machine learning algorithms, wherein the generation of the set of estimated rules uses at least the meta-data associated with at least one selected from the group of the first digital time and the second digital time; and iterating the instructions when the set of time-variable rules is modified or updated.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which:

FIGS. 5A and 5B are flow diagrams illustrating a process for identifying compliant and non-compliant data via an iterative process according to an example embodiment.

FIG. 7 is a diagram illustrating a process for identifying compliant and non-compliant data via an iterative process according to according to an example embodiment.

DETAILED DESCRIPTION OF EXEMPLARY EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

An exemplary system, method, and computer-accessible medium can be provided to verify data compliance by iteratively learning through using data. This can be accomplished by an iterative process during which datasets are marked as being compliant or non-compliant based on a set of parameters against which the data is to be judged as compliant or non-compliant. An example of a set of parameters can include for example, General Data Protection Regulation (GDRP) rules, as set by the European Union. Other examples can include for example, other national or local rules or regulations to assess the status of storage of data. Other examples can include for example, parameters established by a private entity for the compliance or non-compliance of data.

Figure 1:
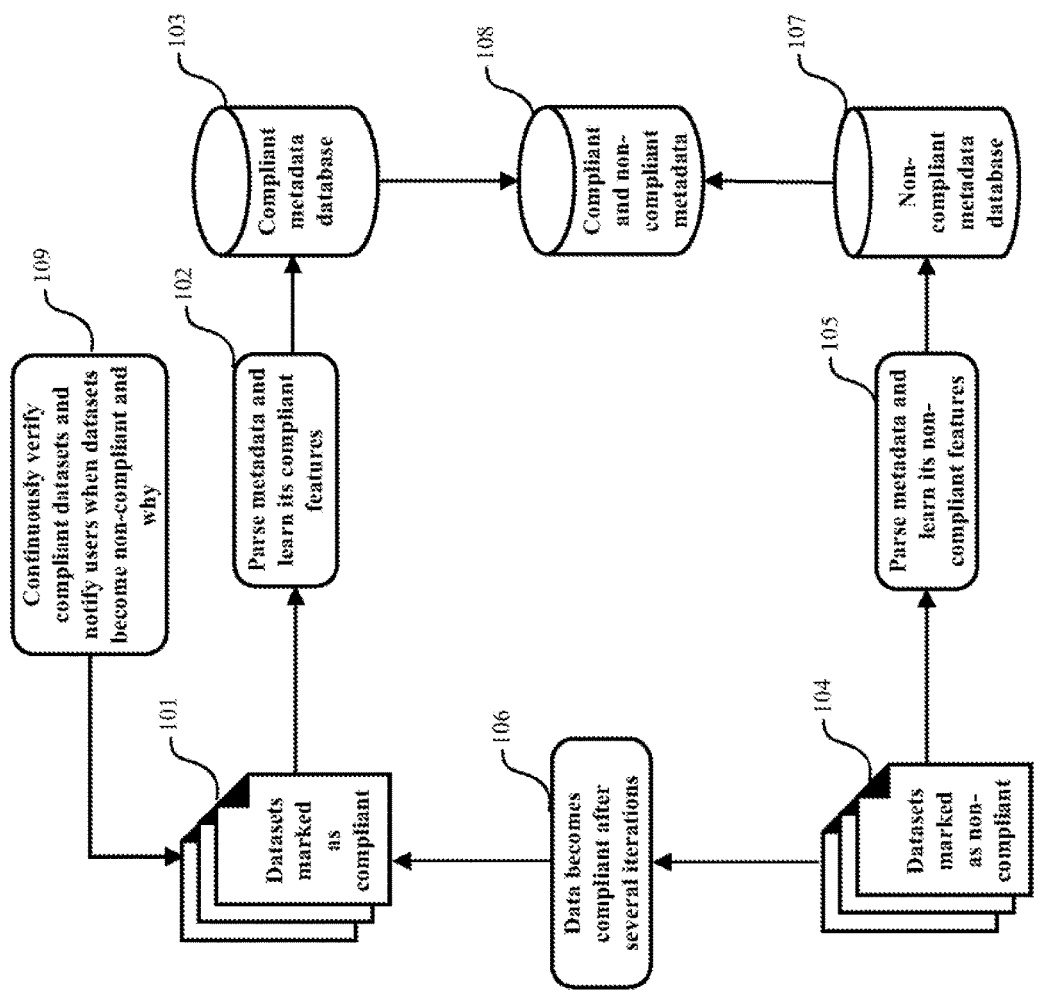
FIG. 1 is a diagram illustrating an initial process for learning compliant features of a dataset that can be used to verify data compliance by iterative learning according to an example embodiment.

FIG. 1 is a schematic diagram illustrating an exemplary system, method, and computer-accessible medium, which facilitates an initial process for learning compliant features of a dataset that can be used to verify data compliance by iterative learning rules, methods, algorithms, classification criteria, through the use of data. A set of parameters can exist against which a set of data, storage of a set of data, an operation transforming that set of data, or a specific use, modification, or access to that data, can be deemed to be compliant or non-compliant. The set of parameters can be a set of rules that are capable of being defined in a human-readable or machine readable format. The set of parameters need not be internally consistent. The set of parameters can be generated from an axiomatic set. Examples of the set of parameters can include for example privacy standards or laws, such as the General Data Protection Regulation (GDRP) rules, as set by the European Union. The compliance of a set of data can be measured against multiple sets of parameters. The multiple sets of parameters may exist on a spectrum, for example, and be entirely unrelated, somewhat related, related, or very related. For example, a set of parameters for privacy standards between two European countries can be very related; a set of parameters between a corporate privacy standard and a government privacy standard may be somewhat related, such as, one may be stricter or have additional parameters compared to the other or one may be a variation of the other by modifying a few of the parameters; or the set of parameters can be entirely unrelated, such as a set of parameters for privacy and another set of parameters for advertising. The set of parameters can also only be applicable to none, a subset of, or the entirety of the set of data.

A set of data marked compliant against, for example, a set of parameters, or a compliant dataset 101, can be collected. Such a dataset can be marked as compliant by using any method to determine that that dataset is compliant. For example, compliant dataset 101 can be manually created by a human using a computer to generate a compliant dataset. This process can occur for example, by a human using a computer to enter data into the compliant dataset 101 manually. The compliant dataset 101 can also be created by synthesizing the dataset through any acceptable method. As an example, an element in the dataset can be synthesized by generating random (or otherwise synthetic) data in accordance with a rule. As an example, an element of data in the compliant dataset 101 can be generated based on a rule such as ensuring the length of the data is less than a certain number of alphanumeric characters, has a certain complexity, or is scrambled or encrypted in some manner. Multiple elements of data in the compliant dataset 101 can similarly be generated. The data in compliant dataset 101 can also be created from a dataset that has had elements manually removed and edited in order to comply with a set of parameters. Compliant dataset 101 can additionally have additional data that defines or identifies which set or sets of parameters the dataset is compliant against. The additional data can include for example, the date or time at which compliance with a particular set of parameters was achieved. This additional data can include a history of the dataset, such as which elements were added or removed to the dataset, and at which times the dataset was compliant or non-compliant.

A set of data marked non-compliant against, for example, a set of parameters, or a non-compliant dataset 104 can be collected. Such a dataset can be marked as non-compliant by any method. For example, non-compliant dataset 104 can be manually created by a human using a computer to generate non-compliant elements or elements that in combination are non-compliant. This process can occur for example by a human using a computer to take a random dataset, remove its compliant elements, and store the non-compliant elements in the non-compliant dataset. As an example, an element in the dataset can be synthesized by generating random (or otherwise synthetic) data in accordance with a rule. In this process, the generation of the random or synthetic data can occur with different degrees of complexity. In one example, the non-compliant elements can be generated using various rules, to give the generated dataset a number of elements with a range of how near they are to being compliant. As an example, an element of data in the non-compliant dataset 104 can be generated based on a rule such as ensuring the length of the data is less than a certain number of alphanumeric characters, has a certain complexity, or is scrambled or encrypted in some manner. As another example, if an element is intended to be of a particular type or format, such as a particular language or length, the generation of the random non-compliant format can ensure that the characteristic of the element is not met. The data in the non-compliant dataset 104 can also be created from a dataset that has had compliant-elements manually removed, leaving only non-compliant elements. Non-compliant dataset 104 can also be generated through generating the union, intersection, complement, or difference of two or more non-compliant datasets. Compliant dataset 104 can additionally have additional data that defines or identifies which set or sets of parameters the dataset is non-compliant against. The additional data can include for example, the date or time at which non-compliance with a particular set of parameters was achieved. This additional data can include a history of the dataset, such as which elements were added or removed to the dataset, and at which times the dataset was compliant or non-compliant.

In step 102, datasets marked as compliant, such as compliant dataset 101, can be parsed in order to learn their compliant features. Through the process described herein a compliant metadata database, such as compliant metadata database 103 can be generated. Step 102 can be performed through, for example, the use of machine learning algorithms. One example of a machine learning algorithm that can be used in step 102 is the random forest supervised learning algorithm. In the random forest algorithm, multiple decision trees are generated and trained. The random forest algorithm builds multiple decision trees and merges the decision trees together to get a more accurate and stable prediction. For example, the algorithm could run and generate trees for various compliant datasets and over time, learn the features of the sets which make said sets compliant or non-compliant. Random forests are a way of averaging multiple deep decision trees, trained on different parts of the same training set, with the goal of reducing variance in the algorithm. The machine learning algorithm can be defined to guide particular types of dataset. For example, the maximum number of features to be considered, the number of trees in the algorithm to be used, or the number of leaves in the decision trees can be defined. Thus, features of the compliant dataset 101 can be learned and used for future classification. Statistical techniques, such as Gini, Chi-square, and entropy, can be used as part of the algorithm in this step. Other statistical techniques, such as the naïve bayes algorithm or the like, can also be used during step 102. First, the metadata or other statistical information contained in a column of information can be obtained, and that label can be marked as compliant or non-compliant based on the similarity to other columns which have been marked compliant. Other features that can be used as simple features can be whether the column contains names by mapping to a name dictionary the text patterns by keeping a list of a text pattern or a regular expression (such as, for example, a phone number being a string of a certain length, with certain punctuation (e.g. ###-###-####) or a social security number being a certain number of digits (e.g. ###-###-####) or an address having certain parameters (e.g. a suffix such as "St.", "Ave.")). Direct mapping from the statistical/metadata properties of that column to historical records of compliant and/or non-compliant columns can be used as well.

However, any number of supervising techniques can be used, such as without limitation, linear regression, naïve bayes classifiers, and/or neural networks. A combination of techniques can be used as well to parse the meta-data involved. Other techniques that can be used include k-means or Gaussian mixture models to identify compliant or non-compliant datasets.

Another machine learning algorithm may correspond to organizing the dataset in a tabular format, and looking at the meta-data associated with each row or each column. Each column of data can correspond to a particular variable, such as for example, a social security number, an address, a name, an eye color, a credit card number, or some other piece of information. Statistical information can be generated from within the column, such as univariant meta-data. For example, if a column is known to correspond to for example a social security number, meta-data associated with that variable can be generated from compliant dataset 101, and added to the compliant metadata database 103. Bi-variate, or multi-variate information can also be used. For example, statistical correlations can exist between column or row variable of the compliant dataset 101 which can be analyzed, extracted, and added to the compliant metadata database 103. Statistical correlations can also exist between multiple datasets. The meta-data that is included in the compliant metadata database can also include for example, the date the compliance of the compliant dataset 101 was established, the set of parameters against which the compliant dataset 101 is compliant, and any subset of the set of parameters which can reflect variations of the set of parameters described above. These statistical correlations can also be used with any suitable algorithm to generate rules to estimate the set of parameters against which compliance was determined. The compliant metadata database 103 can also include additional rules or correlations which may be known due to the nature of type of data being studied, and optionally added by a human using a computer, to add to the compliant metadata database 103.

Univariate information, such as mean, standard deviation, skewness, can be used as a set of statistical information and to calculate correlation between multiple columns of data. These features can be used as input features for a particular classification model. Other statistical information that can be used as a feature for a particular classification model include variations of Bayesian inferences, such as transition probabilities. As an example, certain types of data, such as a person's name, phone number, and address can potentially not be correlated as the type of values for this data are typically unique strings. However, one way to identify correlation between such types of data can be made through a transition probability, i.e., if a name is identified, followed by a phone number, it can be likely that the next column is an address. Thus, such inferences, or probabilities between columns can be combined with other techniques, such as for example, the evaluation of types of strings identified above, to increase the confidence of a column being a certain type of data, such as an address. If an address is known to be a type of non-compliant data, the address can then be marked as such. This process can be abstracted and expanded to other features in the data, and other methods, to increase the confidence of categorizing a particular type of data.

In step 105, non-compliant datasets can be parsed to extract characteristics of the data, such as for example, the meta-data, and to learn the non-compliant features of those datasets. This process can occur in a similar manner to step 102 described above. In addition, step 102 and step 105 can be performed iteratively, using information learned from other steps in learning additional features.

In step 109, compliant datasets are continuously verified to ensure their compliance. This can be done on a regular basis, such as a weekly, monthly, or another set time interval. Step 109 can also be done in response to a trigger, such as a change in the GDRP regulation, a new court interpretation of an existing law, an update to a version of a corporate compliance policy or any other event that may. Step 109 can be accomplished for example by marking compliant datasets as non-compliant in response to a trigger. Compliant datasets may then have to be manually confirmed as compliant before being considered a compliant dataset 101. Step 109 can also be accomplished by only changing compliant datasets to non-compliant when it is decided that a material change in a corporate compliance policy or court interpretation of an existing law is created.

Compliant metadata database 103 and non-compliant metadata database, 107 can be joined. Similarly, step 102 and step 105 can be repeated whenever additional compliant datasets or non-compliant datasets are added to a database of compliant datasets or a database of non-compliant datasets. The compliant metadata database 103 and non-compliant metadata database 107 can be joined to create a joined database of metadata, a mixed metadata database 108. For example, the compliant metadata database 103 can be joined with the non-compliant metadata database 107 to obtain a mixture of verified compliant and non-compliant metadata 108 (i.e., a mixed metadata database).

In step 106, a non-compliant dataset 104 can become compliant through several iterations. This process of iterating the data on the non-compliant dataset 104 can be done through an automated or semi-automated process. For example, an algorithm can examine a non-compliant set and identify and remove or add elements in order to make the set compliant. In another example, random elements of the set of data can be modified, and after each modification, the dataset could be re-examined for compliance. As another example, in an automated or semi-automated process, a fixed or dynamic algorithm can be used which will be able to perform operations on the set of data in an attempt to make non-compliant dataset 104 compliant. At each step, the compliance of the set of data can be examined and meta-data associated with the set (whether the set is compliant or non-compliant at that step) be added to the compliant metadata database 103 or non-compliant metadata database 107. The examination to determine compliance may be performed by an automated process (e.g., an algorithmic process, including a machine learning algorithm). In other examples, the examination to determine compliance may be assisted by a human interacting with a computer and/or otherwise providing input.

Figure 2:
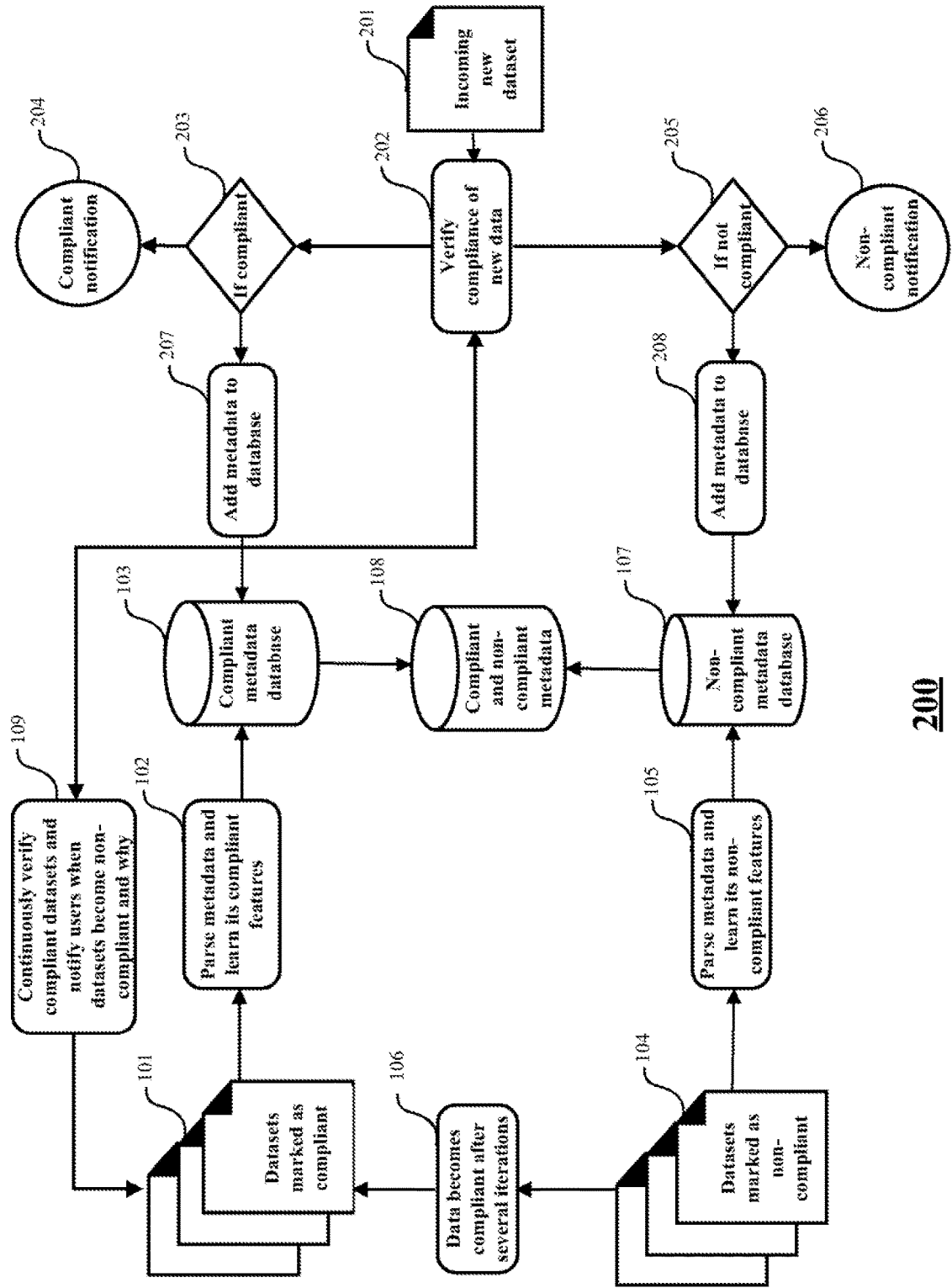
FIG. 2 is a diagram illustrating an initial process for verifying the compliance of new data and marking the data as compliant or non-compliant according to an example embodiment.

FIG. 2 is a schematic diagram illustrating an example system and corresponding method steps which facilitate an initial process for verifying the compliance of new data and marking the data as compliant or non-compliant. A set of data whose state of compliance is unknown, such as new dataset 201, can be classified as compliant or non-compliant.

In step 202, the compliance of new dataset 201 can be determined. In an example embodiment, new dataset 201 can be analyzed using the characteristics derived from the meta-data associated with the dataset. Analysis of the new dataset 201 can be done, for example, by using mixed metadata database 108. The mixed metadata database 108 can be used to for example, compare characteristics of the meta-data of new dataset 201 with those of compliant and non-compliant features stored in mixed metadata database 108. In an example embodiment, machine learning algorithms, such as the random forest algorithm, can be used to classify datasets. Features such as the statistical properties and multivariate properties between multiple columns can also be used, and these properties can be run through some classifiers that can help deem whether the dataset is compliant or not. The mixed dataset 108 can be truncated or organized as needed, or elements in the dataset weighted, such as more recent entries having a higher weight in the following algorithms as compared to older entries.

If compliance of the new dataset 201 is determined, a compliant notification can be generated by the system, or sent to a user of the system. This can be done for example, in step 204. The compliant notification can be any suitable notification that is machine or human readable. The notification can be sent in any suitable manner, including, sending the message via SMS, MMS, a phone call, any combination thereof, or any other suitable architecture or system that facilitates the communication of signals, data, and/or messages. The notification can also be sent to a special purpose application on a user device. The notification can contain additional information which can be configurable. Similarly, if non-compliance of the new dataset 201 is determined, a non-compliant notification can be sent. The non-compliant notification can be configured in a similar manner to the compliant notification. As described further below, the non-compliant notification 206 and compliant notification 204 can contain additional information when a compliant dataset becomes non-compliant, or vice-versa, when a change in the parameters against which compliance is determined occurs.

If the new data is compliant, the metadata from the new dataset can be added to the compliant metadata database. This can happen, for example, in step 207. Step 207 can consist of a process similar to that used in step 102. Step 207 can use a different algorithm than that used in step 102. For instance, only certain metadata may be desired to be extracted. This can be the case to avoid the compounding of errors in mixed metadata database 108 when certain features are not entirely known to be compliant. Similarly, if the non-compliance of a set is determined, such as in step 205, the metadata associated with the set can be added to the non-compliant metadata database 107.

Step 202 and step 109 can also occur in response to one another. For example, once the compliance or non-compliance of a new dataset 201 is determined, it can be continuously monitored similar to as described above in step 109. Similarly, step 202 can occur when a change in a dataset occurs in step 109. These steps can be performed using the methods described within this disclosure.

Figure 3:
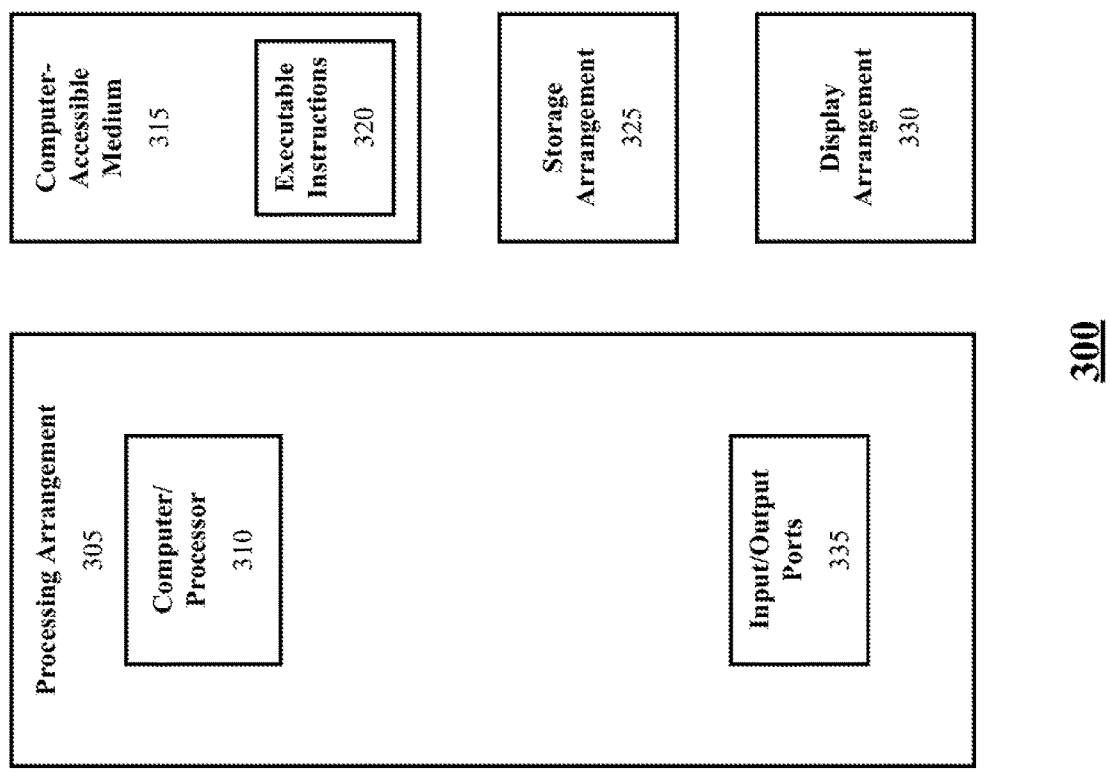
FIG. 3 is a diagram illustrating a process to verify data compliance by iterative learning according to an example embodiment.

FIG. 3 shows a block diagram of an exemplary embodiment of a system 300 according to the present disclosure, which can be used to perform the procedures described below. For example, exemplary procedures in accordance with the present disclosure described herein can be performed by a processing arrangement and/or a computing arrangement (e.g., computer hardware arrangement) 305. Such processing/computing arrangement 305 can be, for example, entirely or a part of, or include, but not limited to, a computer/processor 410 that can include, for example, one or more microprocessors, and use instructions stored on a computer-accessible medium (e.g., RAM, ROM, hard drive, or other storage device).

As shown in FIG. 3, for example a computer-accessible medium 315 (e.g., a storage device such as a hard disk, floppy disk, memory stick, CD-ROM, RAM, ROM, etc., or a collection thereof) can be provided (e.g., in communication with the processing arrangement 305). The computer-accessible medium 315 can contain executable instructions 320 thereon. In addition, a storage arrangement 325 can be provided separately from the computer-accessible medium 315, which can provide the instructions to the processing arrangement 305 so as to configure the processing arrangement to execute certain exemplary procedures, processes, and methods, as described herein above, for example.

Further, the exemplary processing arrangement 305 can be provided with or include an input/output ports 335, which can include, for example a wired network, a wireless network, the internet, an intranet, a data collection probe, a sensor, etc. As shown in FIG. 3, processing arrangement 305 can be in communication with an exemplary display arrangement 330, which, according to certain exemplary embodiments of the present disclosure, can be a touch-screen configured for inputting information to the processing arrangement in addition to outputting information from the processing arrangement, for example. Further, the exemplary display arrangement 330 and/or a storage arrangement 325 can be used to display and/or store data in a user-accessible format and/or user-readable format.

Figure 4:
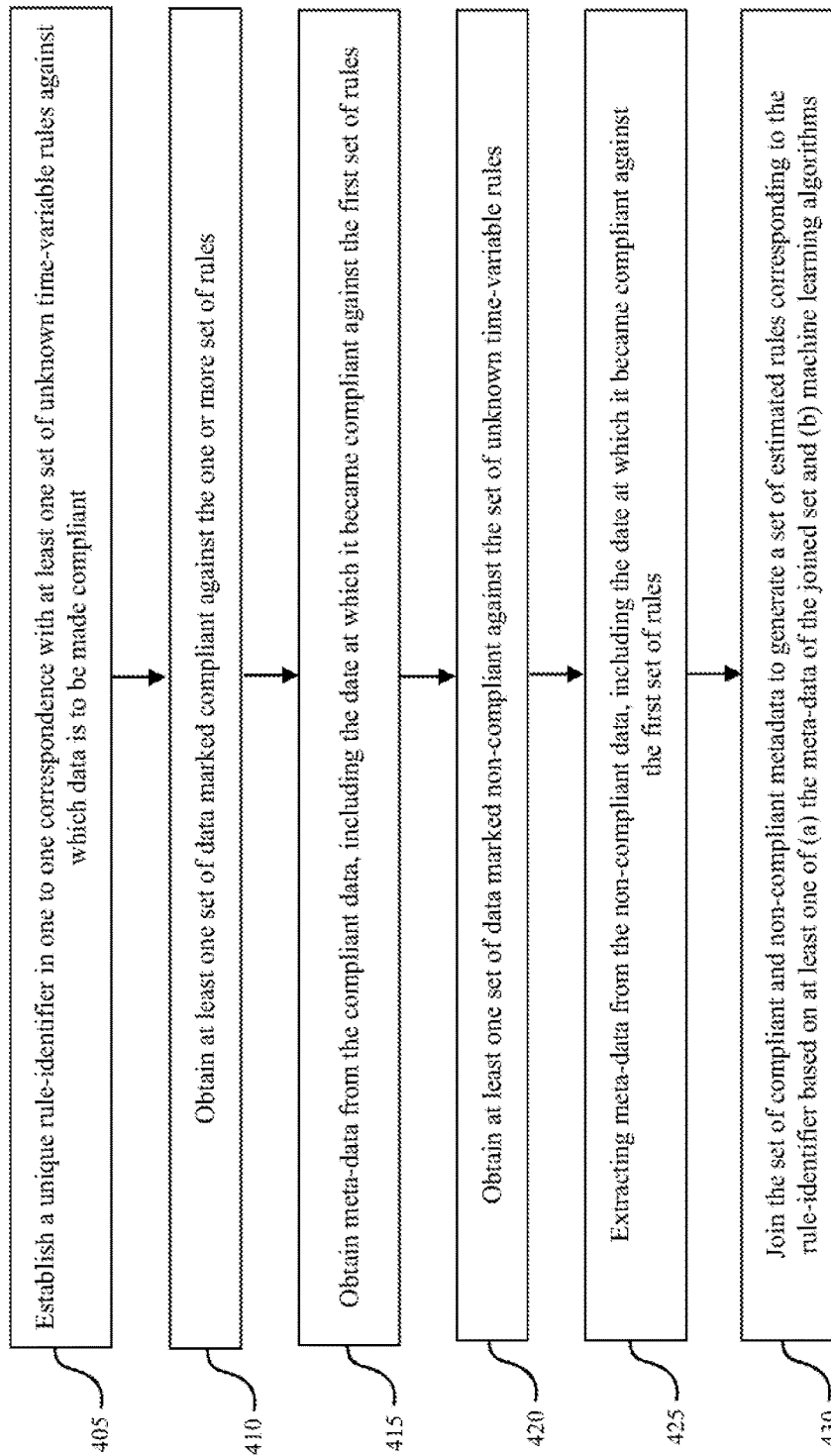
FIG. 4 is a block diagram of a system according to an example embodiment.

FIG. 4 shows an exemplary flow diagram of a method 400 according to an example embodiment of the present disclosure. At step 405, a unique rule-identifier can be established. For example, the unique rule-identifier can be an alphanumeric string which contains information that uniquely corresponds or identifies a set of rules using an automated algorithm that generates unique rule-identifiers or via user input. These rule identifiers can be in one-to-one correspondence with the rules comprising at least one set of unknown or known rules, against which data is to be made compliant. As an example, each rule within the at least one set of unknown or known rules can correspond to one rule identifier. As another example, each set of the at least one set of unknown or known rules can correspond to one rule identifier. The set of unknown or known rules can be time-variable, that is, the rules themselves can change with time. For example, a rule can be considered unknown because it changes with time and, in some examples, the rule can change with time in an unknown or unpredictable way. As another example, a rule can be considered unknown because it is ill-defined or not precise at one point in time, but can be become better defined or more precise at a later point in time. Whether a rule is unknown or known can be a function of that rule in view of a particular set of data.

As another example, a set of data which is compliant or non-compliant against a set of rules which correspond to a rule identifier can change its status over time. The rule identifier can take form, such as an alphanumeric identifier, a sequence of other symbols such as underscores, or a custom format, such as for example, a numeric identifier followed by a date, where the date can indicate when the set of unknown or known rules changed. The rule identifier can be comprised of other smaller identifiers, such as for example, a business identifier and a version identifier. Rules can also be generated when a user marks a particular dataset as non-compliant, at which point a user can select or mark particular columns as non-compliant and also provide a description as to why a particular rule is non-compliant. This can be a technical description, or in another case, be a written description. Further, through the use of natural language processing, information about the particular set of data marked non-compliant, the data of non-compliant, and additional meta-data, additional training of the system can be done to further create a more robust classification method. For example, through the use of natural language processing (NLP), an algorithm can decompose a note, and extract non-compliant features of a set of data, or otherwise understand a note and attempt to create features of criteria for understanding the compliance or non-compliance of a particular set of data.

At step 410, at least one set of data can be obtained for which the compliance is determined for one or more set of rules. This set of data can be in any form similar to as described above. As the same set of data can be compliant against one set of rules, and non-compliant against another set of rules, it can be important to ensure that it is known against which set of rules compliance is determined.

In step 415, meta-data can be obtained from the compliant set, including for example, the date or time at which the set of data became compliant against the first set of rules. This can be done, for example, using any of the methods described above. Meta-data can be obtained for example by using a Random Forest algorithm.

In step 420, a set of data marked non-compliant against a set of rules is obtained. This step can be done in a manner similar to step 410. The set of data marked non-compliant can be against the same set of rules against which a set of data was marked compliant in step 410. In step 425, similar to step 415, meta-data can be obtained from the non-compliant set, including for example, the date or time at which the set of data became compliant against the first set of rules.

In step 430, sets of metadata, i.e., the set of compliant metadata and the set of non-compliant metadata, can be joined to generate a set of estimated rules which correspond to the rule-identifier. This set of estimated rules can be based on for example, the meta-data of the joined set or machine-learning algorithms, which can optionally use the meta-data of the joined set. These set of estimated rules can be used, for example, to classify an unknown set of data, similar to as explained above.

Figure 5A:

FIGS. 5A and 5B show an exemplary flow diagram of a method 500 according to an example embodiment of the present disclosure. At step 505, a unique rule-identifier can be established automatically through an algorithm or via user input. These rule identifiers can be in one-to-one correspondence with the rules comprising at least one set of unknown or known rules, against which data is to be made compliant. As an example, each rule within the at least one set of unknown or known rules can correspond to one rule identifier. As another example, each set of the at least one set of unknown or known rules can correspond to one rule identifier. The set of unknown or known rules can be time-variable, that is, the rules themselves can change with time. Thus, it is conceivable that a set of data which is compliant or non-compliant against a set of rules which correspond to a rule identifier can change its status over time. The rule identifier can take form, such as an alphanumeric identifier, a sequence of other symbols such as under-scores, or a custom format, such as for example, a numeric identifier followed by a date, where the date can indicate when the set of unknown or known rules changed. The rule identifier can be comprised of other smaller identifiers, such as for example, a business identifier and a version identifier.

At step 510, at least one set of data can be obtained for which the compliance is determined for one or more set of rules. This set of data can be in any form similar to as described above. As the same set of data can be compliant against one set of rules, and non-compliant against another set of rules, it can be important to ensure that it is known against which set of rules compliance is determined. In step 515, meta-data can be obtained from the compliant set, including for example, the date or time at which the set of data became compliant against the first set of rules. This can be done, for example, using any of the methods described above. Meta-data can be obtained for example by using a random forest algorithm.

In step 520, a set of data marked non-compliant against a set of rules is obtained. This step can be done in a manner similar to step 510. The set of data marked non-compliant can be against the same set of rules against which a set of data was marked compliant in step 510. In step 525, similar to step 515, meta-data can be obtained from the non-compliant set, including for example, the date or time at which the set of data became compliant against the first set of rules.

In step 530, sets of metadata, i.e., the set of compliant metadata and the set of non-compliant metadata, can be joined to generate a set of estimated rules which correspond to the rule-identifier. This set of estimated rules can be based on for example, the meta-data of the joined set or machine-learning algorithms, which can optionally use the meta-data of the joined set. These set of estimated rules can be used, for example, to classify an unknown set of data, as explained above.

In step 535, a set of data whose compliance status against a set of rules is unknown can be received. This step can comprise of classifying the set as compliant or non-compliant with respect to at least one set of unknown time-variable rules based on the set of estimated rules corresponding to a rule identifier. This step can also comprise classifying the set as compliant or non-compliant based on the meta-data that was extracted, as described above. This step can also be run automatically based on certain criteria or periodically. Step 540 can consist of appending additional data to a compliant set of data, and verifying, or re-verifying, as appropriate the compliance status of the appended set of data. This can be done through any of the methods described above.

In step 545, weights for each of the estimated set of rules corresponding to the rule-identifier can be generated. Compliance can be determined through a statistical method, or through the data passing all compliance criteria and tests. A ranking of rules and notifications can also be created which can inform an end user of the urgency and the cause of non-compliance of a particular set of data. This can be done through any conventional statistical process such as, for example, frequency weights, survey weights, probability weights, importance weights, through fitting for the weight function or the like. In step 550, a computer-based statistical method to classify an unknown set of data as compliant or non-compliant based on at least one of (a) statistical information from the unknown set of data and (b) the generated weights of each of the estimated set of rules corresponding to the rule-identifier can be used. I In step 550, the process of verifying data compliance when a change in at least one of the set of unknown time-variable rules is identified can be iterated. This can happen for example when a change in the rules is prompted. In step 555, the process of verifying data compliance can be iterated when a change in at least one of the set of unknown time-variable rules is identified. This can be done by using any of the methods or processes similar to those described herein. This can also be done through a manual examination of the dataset. In step 560, a list of rules against which a set of data is compliant can be generated. This can be done as the set of rules against which the data is compliant is unknown, ill-defined, or not precise. Accordingly, in this step, any suitable algorithm can be used to generate a list of rules against which a dataset marked compliant would be deemed compliant. One example of such an algorithm is the use of a generative adversarial network to generate a list of rules, or multiple lists of rules, against which a compliant dataset would again be compliant.

In step 565, the process of verifying data compliance when a change in at least one of the data sets marked compliant or marked non-compliant is identified is iterated. This can be done using any of the processes or methods similar to those described herein. In step 570, one set of data can be marked as compliant or non-compliant against multiple sets of unknown time variable rules. Thus, for example, a set of data may be marked as compliant against a first set of unknown time variable rules, while the same set of data may be marked as non-compliant against a second set of unknown time variable rules.

In step 575, suggestions can be generated, which can consist of a subset of data from the non-compliant set which can be modified to make the non-compliant dataset compliant. Suggestions can be generated by, for example, testing permutations of the data in the non-compliant dataset and testing whether it is compliant. In another method, the data can be studied for statistical characteristics which can be modified to cause compliance. In yet another method, any suitable machine learning or generative algorithm can be used to generate suggestions. For example, in one method, the generative algorithm can used by starting with a non-compliant dataset, and testing potential compliant generated sets using the methods similar to as described herein for compliance, calculating the modifications to the data used to generate or to cause a potential compliant dataset, and suggesting those modifications. The process to generate suggestions can be further optimized by, for example, generating a ranking for the modifications required to modify a subset of data from the non-compliant set to make the set compliant. In step 580, one or more compliant datasets can be generated by implementing the suggestions suggested in, for example, step 575. In the same step, non-compliant datasets can be generated. In one example, this can be done by implementing all permutations of the suggestions suggested to generate compliant datasets. Non-compliant datasets can be generated by, for example, extracting a subset of data on which suggestions were suggested. In step 585, additional meta-data for the compliant dataset or additional meta-data for the non-compliant sets can be generated indirectly through the use of a neural network as a classifier to learn meta-data in hidden states without specifying the particular features. In this step, a neural network can be used to study the relevant datasets to classify information, and this information be used to learn meta-data which was not immediately extractable from the datasets or hidden in some form, without specifying the features which were learned.

Figure 6A:
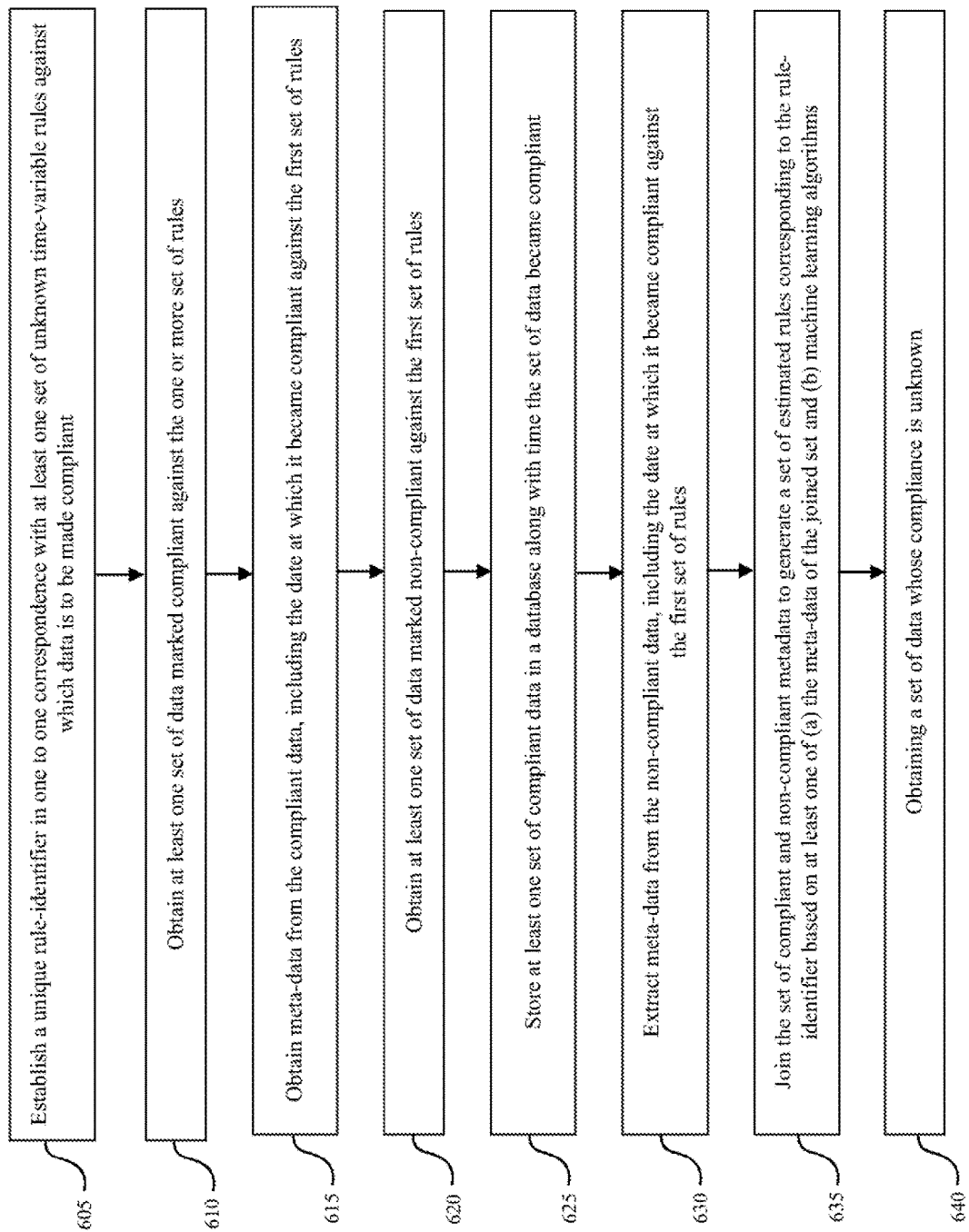
FIGS. 6a and 6B are flow diagrams illustrating a process for identifying compliant and non-compliant data via an iterative process according to an example embodiment.
Figure 6B:
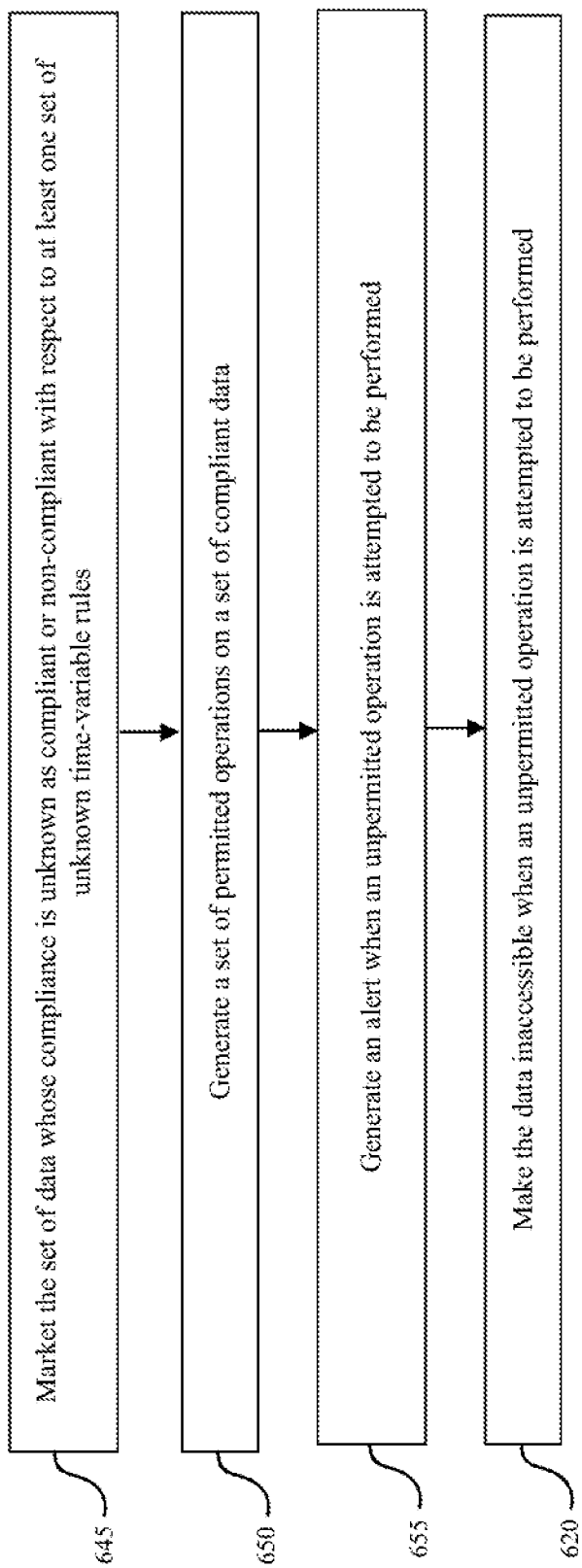

FIGS. 6A and 6B show an exemplary flow diagram of a method 600 according to an example embodiment of the present disclosure. At step 605, a unique rule-identifier can be established through an algorithm that can generate unique values or through user input. These rule identifiers can be in one-to-one correspondence with the rules comprising at least one set of unknown or known rules, against which data is to be made compliant. As an example, each rule within the at least one set of unknown or known rules can correspond to one rule identifier. As another example, each set of the at least one set of unknown or known rules can correspond to one rule identifier. The set of unknown or known rules can be time-variable, that is, the rules themselves can change with time. Thus, it is conceivable that a set of data which is compliant or non-compliant against a set of rules which correspond to a rule identifier can change its status over time. The rule identifier can take form, such as an alphanumeric identifier, a sequence of other symbols such as underscores, or a custom format, such as for example, a numeric identifier followed by a date, where the date or time can indicate when the set of unknown or known rules changed. The rule identifier can be comprised of other smaller identifiers, such as for example, a business identifier and a version identifier.

At step 610, at least one set of data can be obtained for which the compliance is determined for one or more set of rules. This set of data can be in any form as described above. As the same set of data can be compliant against one set of rules, and non-compliant against another set of rules, it can be important to ensure that it is known against which set of rules compliance is determined. In step 615, meta-data can be obtained from the compliant set, including for example, the date or time at which the set of data became compliant against the first set of rules. This can be done, for example, using any of the methods similar to those described above. Meta-data can be obtained for example by using a random forest algorithm. In step 620, a set of data marked non-compliant against a set of rules is obtained. This step can be done in a manner similar to step 610. The set of data marked non-compliant can be against the same set of rules against which a set of data was marked compliant in step 610.

In step 625, similar to step 615, meta-data can be obtained from the non-compliant set, including for example, the date or time at which the set of data became compliant against the first set of rules. In step 630, sets of metadata, i.e., the set of compliant metadata and the set of non-compliant metadata, can be joined to generate a set of estimated rules which correspond to the rule-identifier. This set of estimated rules can be based on for example, the meta-data of the joined set or machine-learning algorithms, which can optionally use the meta-data of the joined set. These set of estimated rules can be used, for example, to classify an unknown set of data, as explained above.

In step 635, a set of data whose compliance status against a set of rules is unknown can be received. This step can comprise of classifying the set as compliant or non-compliant with respect to at least one set of unknown time-variable rules based on the set of estimated rules corresponding to a rule identifier. This step can also include classifying the set as compliant or non-compliant based on the meta-data that was extracted, as described above. In step 640, a set whose compliance is unknown can be obtained. This can be done for example by taking at random, a set of data. This step can also be completed by for example, generating a set of data in a random, or pseudo-random fashion. In yet another method, subsets of data, taken from known datasets, can be merged.

In step 645, a set of data, of which the state of compliance is unknown with respect to at least one set of unknown time-variable rules is marked. This set of data can be marked in any suitable method, such as for example, by appending a tag to the set of data or an identifier to the set of data. In step 650, a set of permitted operations which can be performed on a set of compliant data can be generated. For example, a set of permitted operations can be from the set of operations that can be performed on the set of compliant data, such as viewing the data, exporting the data, merging the data with other sets of data, a particular individual or person with a specific security clearance viewing the data, extracting statistics from the data, scrubbing the data. The set of permitted operations can be generated based on the data in the set and the time-variables rules. The permitted operations can be generated by for example, using rules generated from any suitable machine learning algorithm.

In step 655, an alert can be generated when an unpermitted operation is attempted to be performed by an individual. This alert can be generated when the data is attempted to be accessed in any method not permitted in, for example, the set of permitted operations generated in step 650. In step 660, the data can be made inaccessible when an unpermitted operation is attempted to be performed. This can be done by for example by automatically encrypting the data when an unpermitted operation is attempted to be performed.

FIG. 7 shows an exemplary flow diagram of a method 700 according to an example embodiment of the present disclosure. At step 705, a unique rule-identifier can be established through an algorithm that can generate unique values or through user input. These rule identifiers can be in one-to-one correspondence with the rules comprising at least one set of unknown or known rules, against which data is to be made compliant. As an example, each rule within the at least one set of unknown or known rules can correspond to one rule identifier. As another example, each set of the at least one set of unknown or known rules can correspond to one rule identifier. The set of unknown or known rules can be time-variable, that is, the rules themselves can change with time. Thus, it is conceivable that a set of data which is compliant or non-compliant against a set of rules which correspond to a rule identifier can change its status over time. The rule identifier can take form, such as an alphanumeric identifier, a sequence of other symbols such as underscores, or a custom format, such as for example, a numeric identifier followed by a date, where the date or time can indicate when the set of unknown or known rules changed. The rule identifier can be comprised of other smaller identifiers, such as for example, a business identifier and a version identifier.

At step 710, at least one set of data can be obtained for which the compliance is determined for one or more set of rules. This set of data can be in any form similar to as described above. As the same set of data can be compliant against one set of rules, and non-compliant against another set of rules, it can be important to ensure that it is known against which set of rules compliance is determined. In step 715, meta-data can be obtained from the compliant set, including for example, the date or time at which the set of data became compliant against the first set of rules. This can be done, for example, using any of the methods similar to as described above. Meta-data can be obtained for example by using a random forest algorithm.

In step 720, the at least one set of compliant data can be stored in a database along with the time at which the set of data became compliant. In step 725, a set of data marked non-compliant against a set of rules is obtained. This step can be done in a manner similar to step 710. The set of data marked non-compliant can be against the same set of rules against which a set of data was marked compliant in step 710. In step 730, similar to step 715, meta-data can be obtained from the non-compliant set, including for example, the date or time at which the set of data became compliant against the first set of rules.

In step 735, the at least one set of data marked non-compliant can be joined with the at least one set of data marked compliant, in for example a database, to generate a set of estimated rules corresponding to the rule identifier. The generation of a set of estimated rules corresponding to the rule identifier can be an approximation for the unknown set of rules against which compliance of datasets is measured. The generation of a set of estimated rules can be done based using any suitable method, including for example, algorithms using as part of the algorithm the meta-data of the joined set or machine learning algorithms to generate, score, and compile multiple rules to create a set of rules. As another example, generative networks, such as a generative adversarial network, can be used to generate the set of rules. The generated set of rules can be tested by ensuring that a set of data whose compliance is known matches the same value of compliance (that is compliant or non-compliant) against the generated set of rules. In step 740, one or more steps from step 705 to step 735 can be iterated set of time-variable rules is modified or updated. An example of the set of time-variables rules being modified or updated includes for example, a new version of the rules, a new interpretation of the rules, or a new geographical or temporal boundary on which the rules are deemed to be applicable.

The present disclosure is not to be limited in terms of the particular embodiments described in this application, which are intended as illustrations of various aspects. Many modifications and variations can be made without departing from its spirit and scope, as can be apparent. Functionally equivalent methods and apparatuses within the scope of the disclosure, in addition to those enumerated herein, can be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

What is claimed is:

1. A method, comprising:

storing in a database a first set of rules;

establishing, using a processor, a unique rule-identifier in one-to-one correspondence with at least one set of unknown time-variable rules against which data is to be made compliant;

obtaining at least one set of compliant data, wherein the at least one set of compliant data is compliant against the first set of rules;

extracting, using a processor, meta-data from the at least one set of compliant data, including a first date at which the at least one set of compliant data became compliant against the first set of rules;

obtaining at least one set of non-compliant data, wherein the at least one set of non-compliant data is marked non-compliant against the at least one set of unknown time-variable rules;

extracting, using a processor, meta-data from the at least one set of non-compliant data;

joining the meta-data extracted from the at least one set of compliant data and the meta-data extracted from the at least one set of non-compliant data to create a joined meta-data dataset;

extracting, using a processor, meta-data from the joined meta-data dataset; and generating, using a processor, a set of estimated rules corresponding to the unique rule-identifier, wherein the processor uses the first date and at least one selected from the group of (i) the meta-data extracted from the joined dataset or (ii) machine learning algorithms.

2. The method of claim 1, further comprising receiving an unknown set of data and classifying the unknown set of data as compliant or non-compliant with respect to the at least one set of unknown time-variable rules based on a set of estimated rules corresponding to the rule-identifier.

3. The method of claim 2, further comprising appending additional data to at least one of the at least one set of compliant data and re-verifying the appended set of data.

4. The method of claim 2, further comprising generating weights for each rule of the estimated set of rules corresponding to the rule-identifier.

5. The method of claim 4, further comprising using a computer-based statistical method to classify an unknown set of data as compliant or non-compliant based on at least one of (i) statistical information from the unknown set of data and (ii) the generated weights of each rule of the set of estimated rules corresponding to the rule-identifier.

6. The method of claim 2, further comprising iterating the process of verifying data compliance when a change in at least one of set of unknown time-variable rules is identified.

7. The method of claim 2, further comprising generating a list of rules against which a set of data is compliant.

8. The method of claim 2, further comprising iterating the method when a change is identified in at least one selected from the group of the at least one set of compliant data and the at least one set of non-compliant data.

9. The method of claim 2, further comprising classifying the joined meta-data dataset as compliant or non-compliant with respect to multiple sets of unknown time-variable rules.

10. The method of claim 9, further comprising generating suggestions of a subset of data from the at least one set of non-compliant data to modify to make the at least one set of non-compliant data compliant.

11. The method of claim 10, further comprising automatically generating one or more subsets of the at least one set of non-compliant data by automatically implementing the generated suggestions.

12. The method of claim 1, further comprising automatically generating additional meta-data for the at least one set of compliant data or additional meta-data for the at least one set of non-compliant data using a neural network.

13. The method of claim 1, wherein the at least one set of unknown time-variable rules are General Data Protection Regulation rules corresponding to a country or region.

14. The method of claim 1, wherein the at least one set of unknown time-variable rules are defined by a private entity.

15. A system, comprising:
a computer hardware arrangement consisting of at least a processor and memory, configured to iteratively:
store in a database a first set of rules;
establish a unique rule-identifier in one-to-one correspondence with a set of unknown-time variable rules against which data is to be made compliant;
obtain a compliant dataset from a database, wherein the compliant dataset is complaint against the first set of rules;
obtain meta-data from the compliant dataset, including a first date at which the compliant dataset became compliant against the first set of rules;
obtain a non-compliant dataset, wherein the non-compliant dataset is marked non-compliant against the first set of rules;
store the compliant dataset in the database along with a first time indicating the time at which the compliant dataset became compliant against the first set of rules;
extract meta-data from the non-compliant dataset, including a first date at which the non-compliant dataset became compliant against the first set of rules;
join the meta-data from the compliant dataset and the meta-data from the non-compliant dataset to create a joined dataset;
generate, using the processor, a set of estimated rules corresponding to the unique rule-identifier, wherein the processor uses the dates associated with the joined dataset and at least one selected from the group of (i) the meta-data of the joined dataset or (ii) machine learning algorithms;
obtain an unknown compliance dataset, wherein the compliance of the unknown compliance dataset with respect to the at least one set of unknown time-variable rules is unknown; and
mark unknown compliance dataset as compliant or non-compliant with respect to the at least one set of unknown time-variable rules.

16. The system of claim 15, further configured to generate a set of permitted operations on the compliant data set.

17. The system of claim 16, wherein an alert is generated when an unpermitted operation is attempted to be performed.

18. The system of claim 16, wherein the operation is from a set of technical and organizational measures as defined in the General Data Protection Regulation rules.

19. The system of claim 18, wherein data from at least one selected from the group of the compliant dataset, the non-compliant dataset, or the unknown compliance dataset is made inaccessible when an unpermitted operation is attempted to be performed.

20. A non-transitory computer-accessible medium having stored thereon computer-executable instructions wherein, when a computer arrangement executes the instructions, the computer arrangement is configured to perform procedures comprising:
storing in a database a first set of rules;
generating using a processor a unique rule-identifier to identify at least one set of time-variable rules against which data is to be made compliant;
obtaining at least one set of compliant data, wherein the at least one set of compliant data is compliant against the first set of rules;
obtaining meta-data from the at least one set of compliant data, including a first digital time at which the at least one set of compliant data became compliant against the first set of rules;
storing the at least one set of compliant data in a database along with the first digital time;
obtaining at least one set of non-compliant data, wherein the at least one set of non-compliant data is marked non-compliant against the first set of rules;
extracting meta-data from the at least one set of non-compliant data, including a second digital time at which the at least one set of non-compliant data became compliant against the set of time-variable rules;
joining the meta-data extracted from the at least one set of compliant data and the meta-data extracted from the at least one set of non-compliant data to generate a joined meta-data dataset and a set of estimated rules corresponding to the rule-identifier based on at least one selected from the group of (i) the meta-data of the joined meta-data dataset or (ii) machine learning algorithms, wherein the generation of the set of estimated rules uses at least the meta-data associated with at least one selected from the group of the first digital time or the second digital time; and
iterating the instructions when the set of time-variable rules is modified or updated.

* * * * *